(12) United States Patent  (10) Patent No.: US 7,404,053 B2
Kodama et al.  (45) Date of Patent: *Jul. 22, 2008

(54) DIRECT ACCESS STORAGE SYSTEM WITH COMBINED BLOCK INTERFACE AND FILE INTERFACE ACCESS

(75) Inventors: Shoji Kodama, San Jose, CA (US); Akira Yamamoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/637,063

(22) Filed: Dec. 12, 2006

(65) Prior Publication Data

US 2007/0088880 A1    Apr. 19, 2007

Related U.S. Application Data

(63) Continuation of application No. 10/688,277, filed on Oct. 17, 2003, now Pat. No. 7,167,960, which is a continuation-in-part of application No. 09/829,470, filed on Apr. 9, 2001, now Pat. No. 6,779,063.

(51) Int. Cl.
*G06F 12/16* (2006.01)
(52) U.S. Cl. .............................. 711/162; 707/1; 710/74
(58) Field of Classification Search ........................ None
See application file for complete search history.

(56) References Cited

U.S. PATENT DOCUMENTS

| 5,680,537 A | 10/1997 | Byers et al. ..................... 714/5 |
| 5,828,823 A | 10/1998 | Byers et al. ..................... 714/24 |
| 5,838,950 A | 11/1998 | Young et al. ................... 703/21 |
| 5,920,893 A | 7/1999 | Nakayama et al. |
| 5,983,317 A | 11/1999 | Kanda et al. |
| 6,000,020 A | 12/1999 | Chin et al. |
| 6,108,750 A | 8/2000 | Yamamoto et al. |
| 6,115,797 A | 9/2000 | Kanda et al. |
| 6,145,006 A | 11/2000 | Vishlitsky et al. |
| 6,195,703 B1 | 2/2001 | Blumenau et al. |
| 6,230,200 B1 | 5/2001 | Forecast et al. ............. 709/226 |
| 6,233,660 B1 | 5/2001 | Vishlitzky |
| 6,272,571 B1 | 8/2001 | Bachmat |
| 6,301,605 B1 | 10/2001 | Napolitano et al. ......... 709/201 |
| 6,304,940 B1 | 10/2001 | Beardsley |
| 6,324,581 B1 | 11/2001 | Xu et al. |
| 6,425,051 B1 | 7/2002 | Burton et al. |
| 6,430,660 B1 | 8/2002 | Kemp et al. |
| 6,446,141 B1 | 9/2002 | Nolan et al. |
| 6,505,273 B2 | 1/2003 | Taroda et al. |
| 6,516,351 B2 | 2/2003 | Borr |
| 6,549,988 B1 | 4/2003 | Gertner |
| 6,574,667 B1 | 6/2003 | Blumenau et al. ........... 709/229 |
| 6,598,129 B2 | 7/2003 | Kanda et al. |
| 6,606,690 B2 | 8/2003 | Padovano .................... 711/148 |
| 6,868,417 B2 | 3/2005 | Kazar et al. |
| 6,948,012 B1 | 9/2005 | Valin et al. |
| 6,978,324 B1 | 12/2005 | Black |

(Continued)

*Primary Examiner*—Gary J Portka
(74) *Attorney, Agent, or Firm*—Mattingly, Stanger, Malur & Brundidge, P.C.

(57) ABSTRACT

A storage system includes a storage controller and storage media for reading data from or writing data to the storage media in response to block-level and file-level I10 requests. The storage controller includes suitable interfaces for receiving the read/write requests and effecting the reading of data to or the writing of data to the storage media.

20 Claims, 13 Drawing Sheets

U.S. PATENT DOCUMENTS

| | | | |
|---|---|---|---|
| 2001/0037406 A1 | 11/2001 | Philbrick et al. | 709/250 |
| 2002/0095547 A1 | 7/2002 | Watanabe et al. | |
| 2002/0156984 A1 | 10/2002 | Padovano | 711/148 |
| 2002/0161855 A1 | 10/2002 | Manczak et al. | |
| 2003/0046357 A1 | 3/2003 | Doyle et al. | |
| 2003/0110237 A1 | 6/2003 | Kitamura et al. | |
| 2003/0120743 A1 | 6/2003 | Coatney et al. | |
| 2003/0126523 A1 | 7/2003 | Corbett et al. | |

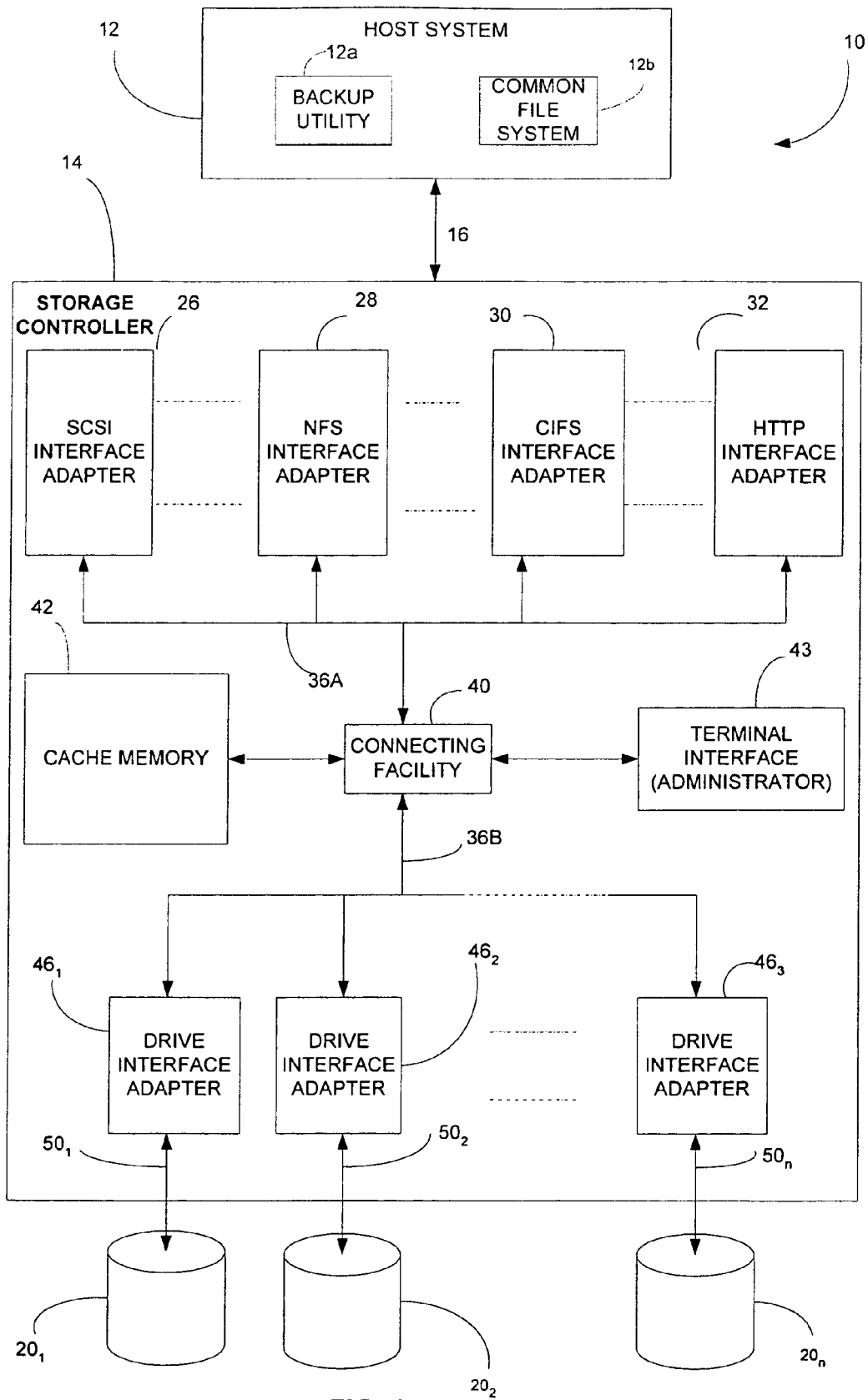
FIG_1

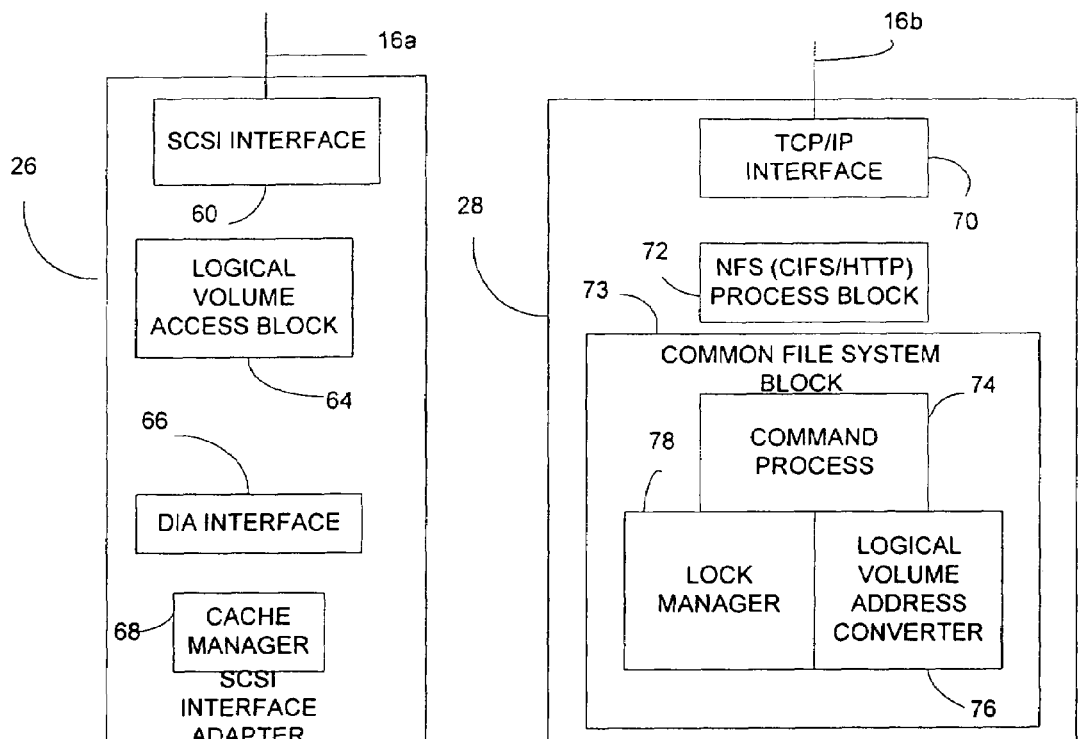
FIG_2
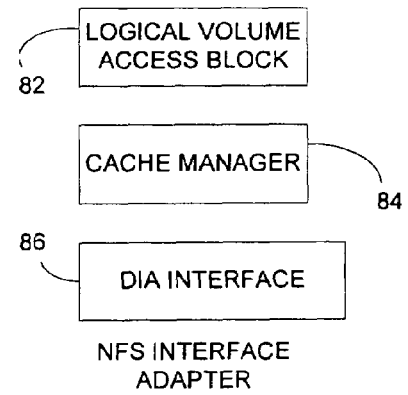
FIG_3
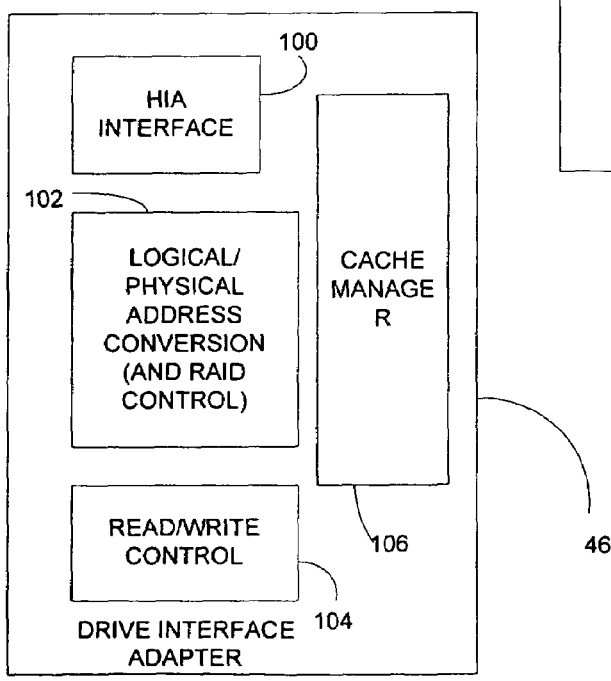
FIG_4

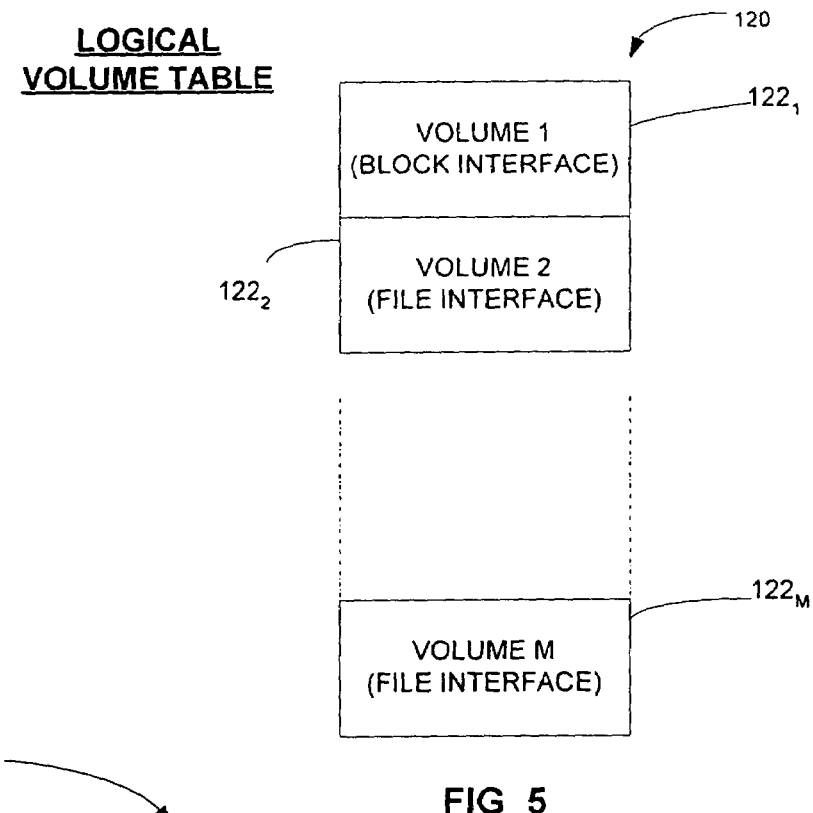
FIG_5
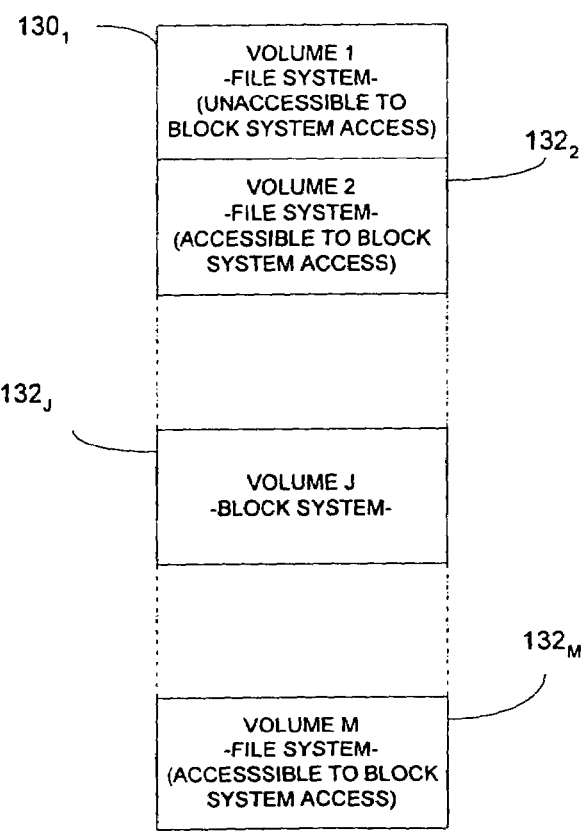
FIG_6

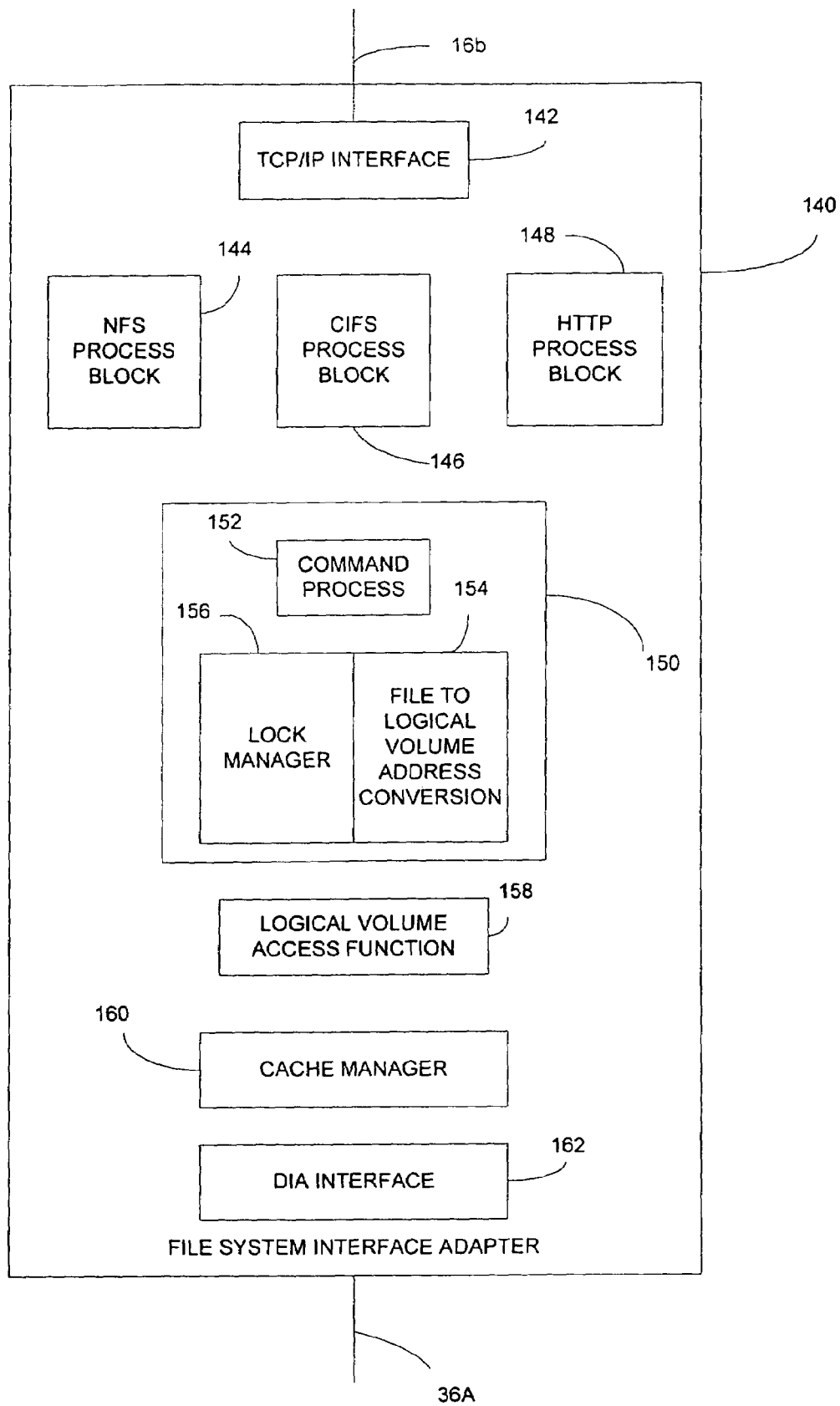
FIG_7

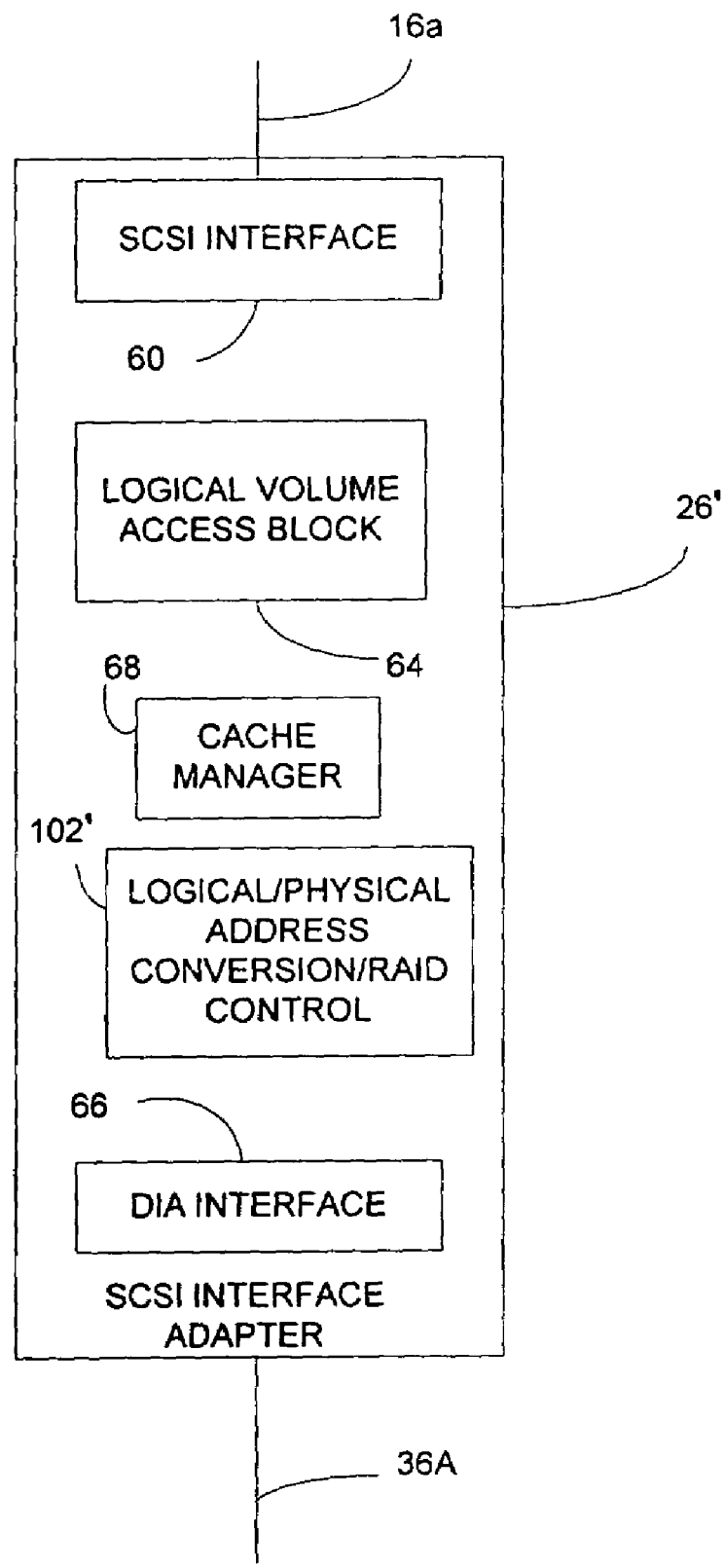
FIG_8

DIRECT ACCESS STORAGE SYSTEM WITH COMBINED BLOCK INTERFACE AND FILE INTERFACE ACCESS

CROSS REFERENCE TO RELATED APPLICATIONS

The present invention is a continuation application of U.S. application Ser. No. 10/688,277, filed Oct. 17, 2003, now U.S. Pat. No. 7,167,960, which is a continuation-in-part of U.S. application Ser. No. 09/829,470, filed Apr. 9, 2001, now U.S. Pat. No. 6,779,063, and is herein incorporated in its entirety by reference for all purposes.

BACKGROUND OF THE INVENTION

The present invention relates generally to data processing systems, and particularly to a direct access storage system with a combined block interface and file interface access.

Interconnecting the various elements of a processing system (e.g., processor units and peripheral equipment such as direct access storage devices) permits the resources of the system to be distributed so that they are available to all elements of the system. For example, multiple processor units may be connected to a storage system for sharing not only the afforded storage space, but the files that are stored there. Typically, a network architecture of one type or another will be used to implement the interconnection, which may dictate the particular of interface structure between the elements of a system, e.g., a processor unit and a data storage system. For example, it has been popular to connect stand-alone processor units to a direct access storage devices using a small computer standard interface (SCSI). SCSI connections use block transfer protocols in which a logical unit number (LUN) identifies the logical volume for access.

Network protocols, on the other hand, are different. Protocols of choice for networked and distributed processing systems included Network File System ("NFS;" an open operating system developed by Sun Microsystems), a Common Internet File System protocol ("CIFS;" a remote file access protocol), or a HyperText Transport Protocol, more popularly known as "HTTP." These protocols use what is known as a "file system interface," and while the file interface structures used to implement the different file system interface protocols, they use a common file system structure. Thus, data stored on a storage system using a file system interface of two or more types are available to all host systems. For example, a storage system capable of handling input/output requests of both NFS and CIFS protocols, i.e., an NFS protocol interface and a CIFS protocol interface, can store data files that are accessible to host processors having either of the NFS interfaces. That is, a host system with only an NFS interface can access and open files stored by a host system with a CIFS interface, and the host system with a CIFS interface can access and open files stored by the system via the NFS interface—provided the storage system has both interfaces.

Storage systems having one or more of the file system interfaces of the types described above provide access through an I/O read or write request that includes a file name, and an lock request that seeks a right to access the particular file of the I/O request.

Most direct access storage systems have either a block interface or a file interface, and host systems using a block interface protocol cannot access storage systems employing file interface protocols. Further, because of the differences between block and file interface structures and the way data is stored and accessed, a storage system is structured for a block system or a file system, but not both.

Remote replication is a backup technique that is used for data recovery scenarios such as disaster recovery. As a typical example, considers a RAID based storage configuration. A primary data side will have a first RAID controller for data access in a first RAID storage component. A second RAID controller at a secondary data site is provided for data backup in a second RAID storage component. The two RAID controllers are typically connected to each other via a communication network. Data in a primary volume in the first RAID storage component presented by the RAID controller at primary site can be replicated to a secondary volume in the second RAID storage component presented by the RAID controller at secondary site. When a write request to the primary volume is received by the first RAID controller, it sends the data update directly to the second RAID controller with no server involvement. This replication functionality is also referred to as "remote copy." e.g., Hitachi TrueCopy™. Conventional RAID controllers have block system interfaces such as Fibre Channel and so are connectable to a storage area network (SAN). However, such controllers cannot connect to a network attached storage (NAS) device since they do not support file system I/O. Hereinafter, a storage system that is attachable to a SAN and which does not have a file system is referred to a SAN device.

Some NAS devices also provide replication capability for disaster recovery or other purpose. For instance, Network Appliance™ SnapMirror® software replicates data on one or more network filers over a LAN or WAN and continuously updates the replicated data.

BRIEF SUMMARY OF THE INVENTION

The present invention provides a storage system with direct access to physical storage devices that can be shared between a block interface and a file interface. An aspect of the invention provides for a volume accessed by block-level I/O requests (block volume) and a volume accessed by file-level I/O requests (file volume) to be maintained in a consistency group. Another aspect of the invention mirroring is performed on the block volume and the file volume. In still another aspect of the invention, mirrored volumes can be provided by accessing another storage subsystem.

BRIEF DESCRIPTION OF THE DRAWINGS

FIG. 1 is a block diagram illustration of processing system that includes a storage system constructed according to the teachings of the present invention;

FIG. 2 is a block diagram broadly depicting the SCSI interface adaptor shown in FIG. 1;

FIG. 3 is a block diagram broadly depicting a files system interface adaptor as shown in FIG. 1;

FIG. 4 is a block diagram that illustrates a drive interface adaptor as shown in FIG. 1;

FIGS. 5 and 6 illustrate two types of logical volume status tables as used in connection with the present invention;

FIG. 7 illustrates a file interface adaptor according to an alternate embodiment of the invention;

FIG. 8 is an alternate embodiment of a SCSI interface adapter for use in the storage controller of FIG. 1;

DESCRIPTION OF THE SPECIFIC EMBODIMENTS

Figure 9A:
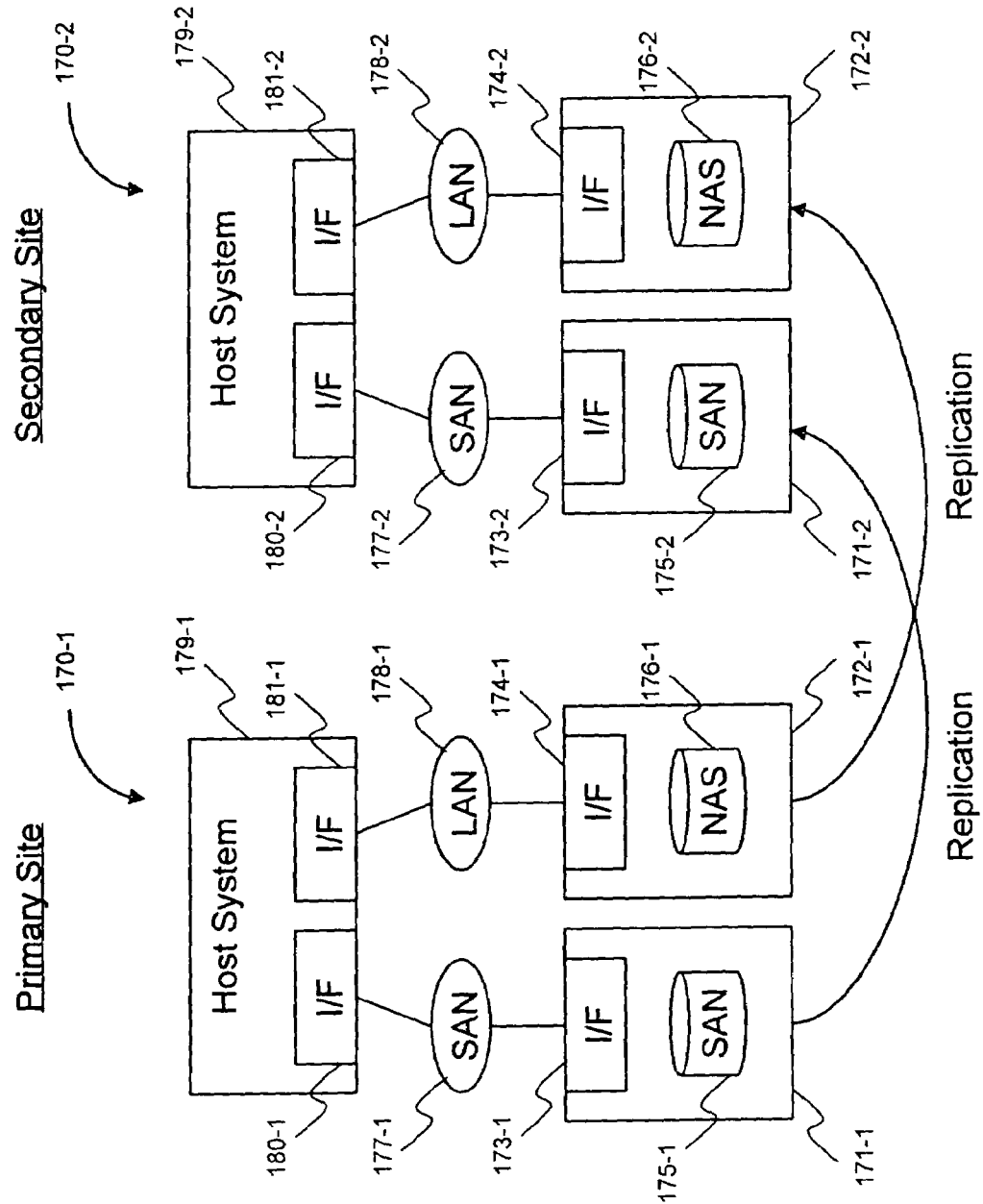
FIG. 9A shows a SAN and NAS configuration with remote copying capability.

Turning now to the figures, and first to FIG. 1, there is illustrated a processing system 10 that includes a host system 12 coupled to a storage system comprising a storage controller 14 and a plurality of physical disk units 20 ($20_1$, $20_2$, ..., $20_n$) that are managed by the storage controller 14.

Although not specifically shown, the host system 12 most likely will comprise a plurality of processor units, although it could also comprise a single processor unit with multiple I/O interfaces, including a block system interface and at least one file system interface. It should be understood, therefore, that the host system however implemented will include at least one SCSI protocol type interface (for block system file transfers with the storage controller 14) and at least one file system interface, such as an interface or interfaces that operation according to NFS, CIFS, and/or HTTP protocols. Accordingly, the host system may comprise multiple processor units, one having an SCSI interface, another with an NFS interface, still another with a CIFS interface, and so on. Alternatively, the host system may be implemented by a single processor unit having all four (SCSI, NFS, CIFS, and HTTP) type interfaces.

As FIG. 1 shows, the host system will include, according to an aspect of the present invention, a backup utility 12a, shown in phantom in FIG. 1, a common library system library data structure 12b. These programmatic elements are included in that portion of the host system 12 having the SCSI type interface to implement said aspect of the invention. They are described more fully below.

The host system 12 is coupled to the storage controller 14 by a bus structure 16. For reasons that will become clearer below, the bus system 16 may be multiple bus structures to connect the host system to corresponding ones of four interface adaptors 26-32 of the storage controller 14.

As FIG. 1 shows, the storage controller 14 includes four types of interface adaptors: a SCSI interface adaptor 26, a NFS interface adaptor 28, a CIFS interface adaptor 30, and a HTTP interface adaptor 32. Each is configured to handle a specific protocol. Accordingly, the SCSI interface adaptor 26 is configured to receive, from the host system 12, SCSI or block system protocol type input/output requests. As is conventional, a block system protocol request will include a logical unit number, a block identification (ID) within the specified logical unit, and data link. File system protocol requests, depending upon type, are received by the NFS, CIFS, and/or HTTP interface adaptors 28, 30, 32. File system protocol requests will typically utilize an upper layer protocol of TCP/IP that includes an identification of a specific file name rather than a logical unit number.

The storage system 14 may have any number of any type of the interface adapters 28-32. For example, a storage controller 14 configuration may include two (2) SCSI interface adaptors 26, one (1) NFS interface adaptor 28, three (3) CIFS interface adaptors 30, and two (2) HTTP interface adaptors 32. Alternatively, another storage controller 14 configuration may have just four interface adapters, one of each type, with the capability of having more adapters of any type added. As can be seen, a variety of other alternative storage controller configurations are possible. By providing the storage controller 14 with such a flexible architecture, high scalable performance and high availability is achieved. This, in turn, provides a storage system controller 14 with the capability of increasing, for example, the number of NFS interface type adapters according to performance demands placed upon the storage system by the host system 12. Moreover, by providing the storage controller 14 with multiple interface adapters of the same type (e.g., NFS interface adapters) a failure of one still leaves the other or others of that same type to execute the requested processing from the host system.

Continuing with FIG. 1, the various adaptors 26, ..., 32 of the storage controller 14 connect to drive interface adaptors 46, one for each physical disk unit 20, through a system bus 36A, 36B, and a connecting facility 40. The connecting facility is basically an arbiter that functions to arbitrate communicative access between the various interface adaptors 26, ..., 32 and the drive interface adaptors 46. In addition the connecting facility 40 will also arbitrate access for the interface adaptors 26, ..., 32 to the cache memory 42.

Although FIG. 1 shows only one drive interface adapter 46 for each physical disk unit 20, in order to provide fault tolerant capability, as well as increased performance, the physical disk units 20, or any of them, may have two or more drive interface adapters 46 servicing them.

The storage controller 14 also includes a terminal interface adaptor 43 to provide a system administrator with access to the storage controller for configuration purposes, as will be discussed more fully below.

Referring now to FIG. 2, there is illustrated in block diagram form the SCSI interface adaptor 26. The SCSI interface adaptor 26, as are the file system and drive interface adaptors 28, 46 (FIGS. 3 and 4), are illustrated in terms of the major functions performed by each. It will be evident to those skilled in this art that the functional aspects of the adaptors 26, 28, and 46 may be implemented in a variety of known ways such as, for example, with programmed microprocessors and associated support circuitry, state machines, or a combination of such construction with or without additional circuitry.

As FIG. 2 shows, the SCSI interface adaptor 26 will include an SCSI interface function and circuitry configured to be coupled to a compatible SCSI interface of the host system 12. The SCSI interface adaptor 26 operates to receive I/O read or write requests from the host system 12, and to communicate responses back to the host system 12. For that purpose, the SCSI interface adaptor 26 includes a SCSI interface function 60 for handling the protocol needed for SCSI data communication.

As will be seen, the storage controller 14 employs a logical volume management in order to share the resources of the physical disk units 20 between block system and file system interfaces. Accordingly, the SCSI interface adaptor includes a logical disk access block function 64 that is configured to convert the LUN of a I/O read or write request to a logical volume access. Also included in the SCSI interface adapter 26 is a drive interface adaptor (DIA) interface function 66 to handle the communication colloquy with the drive interface adaptors 46 in response to information provided by the logical disk access block 64. A conventional cache manager function 68 manages data access of the SCSI interface adapter 26 to the cache memory 42 by the SCSI interface adaptor 26.

The NFS interface adaptor 28 is functionally illustrated in FIG. 3. The other file system interface adapters, i.e., the CIFS and HTTP interface adapters are functionally equivalent to the NFS interface adapter, with the exception of the process block 72, so that the description of the NFS interface adapter 28 will apply equally to the CIFS and HTTP interface adapters 30 and 32 unless otherwise noted. As FIG. 3 shows, the NFS interface adaptor includes a TCP/IP interface function 70 for handling I/O requests and responses thereto between the storage controller 14 and an NFS interface of the host system 12 according to the communications protocols incorporated in TCP/IP. A process block 72 operates to interpret the NFS features of an I/O read or write request, and formulates the responses thereto for communication to the host system 12 (FIG. 1). For a CIFS or HTTP interface adapter, the process block function 72 would need to be configured to accommodate the particular protocol. A common file system function block 73 includes a command process function 74, a logical volume address converter function 76, and a lock manager function 78. The common file system function block 73 will receive an I/O read or write request from the TCP/IP interface function 70, convert the file interface information of the request to block interface information, and pass the block interface information to a logical disk access function 82 (which is substantially the same as that of the SCSI interface adapter 26). Then, the logical disk access function 82 forwards that request to a logical volume that maps to a portion of the physical storage space implemented by the physical disk units 20.

As did the SCSI interface adaptor 26, the NFS interface adaptor 28 includes a cache manager function 84 for managing accesses to the cache memory 42 (FIG. 1) and a drive interface adapter (DIA) function 86 for handling data communication with a drive interface adaptor 46.

FIG. 4 illustrates the functional features of a drive interface adaptor 46. As FIG. 4 shows, the drive interface adaptor 46 will include a host interface adapter (HIA) interface function 100 to handle communication with a particular interface adapter 26, 28, . . . , 32. A logical/physical address conversion function 102 converts logical addresses received from the logical volume access block functions of the interface adapters (e.g., logical volume access block 64 of the SCSI interface adaptor 26, or the logical disk access blocks 64 in either of the NFS, CIFS, or HTTP interface adaptors 28, 30, 32). If a redundant array of inexpensive disk (RAID) architecture is implemented, the logical/physical address conversion function 102 will operate to manage that architecture, handling the mirroring of data in the case of a RAID 1 architecture, for example, or controlling the data striping employed in a RAID 5 architecture.

A cache manager function 106 of the drive interface adaptor 46 manages data accesses with the cache memory 42. A Read/Write control function 104 handles the actual data flow, pursuant to a read or a write request, between the drive interface adaptor 46 and the associated physical disk unit 20.

Operation of the system of FIG. 1 in connection with a block system I/O request is generally as follows. Block system I/O read or write requests will be received by the SCSI interface adaptor 26 on a SCSI bus 16a (FIG. 2). Such requests, as indicated above, will have a LUN which includes a block ID in the specified LUN and a data length as is conventional. The request will be received by the SCSI interface function 60 and passed to the logical volume access block function 64. If the request is an I/O read request, the logical volume access function will first check, through the cache manager 68, to see if the requested data resides in the cache memory 42 (e.g., from a prior read request for the data, or from a prior write of the data to the physical disk units 20). If so, the logical volume access block function 64 will access the cache memory 42 for the block identified in the I/O read request, and forward it to the SCSI interface function 60. The SCSI interface function 60, in turn, will forward the requested data to the host system 12. If, however, the requested block does not exist in the cache memory 42, the logical volume access block will send a request, through the DIA interface 66, to the HIA interface 100 of the drive interface adaptor 46 for the physical storage 20 whereat the requested data block resides. The SCSI interface adaptor will then wait for a response, performing other processing as necessary.

If, on the other hand, the I/O request received from the host system 12 is a write request, the logical volume access function 64 will send the data block received with the request to the cache memory 42. Then, the logical volume access function 64 will, through the DIA interface function 66, send a write request to appropriate the drive interface adaptor 46, identifying the location in the cache memory 42 at which the data block to be written resides. The drive interface 46 will then access the cache memory 42 for the data block, and write it to physical storage 20.

File system requests are received by one of the file system interfaces: either the NFS, the CIFS, or the HTTP interface adapter, depending upon whether the source is a NFS, CIFS, or HTTP interface of the host system 12 and, therefore, one of the three protocols file system protocols: that is, NFS, CIFS, or HTTP. File system I/O requests may be accompanied by lock/unlock requests. A lock request seeks access to a specific data block within a specific file, or the file itself. An unlock request releases access to the block/file previously obtained. As is conventional, an lock or unlock request will include either the file name of the file sought to be accessed, or a block number in the specified file, and a block length. Alternatively, the request may include a file name and additional information identifying the right to access the file.

Control information for lock/unlock processing is stored in the cache memory 42 for the each of the protocols used by the file system interface adaptors 28, 30, 32, although other shared memory can be used if available.

File system I/O requests issued by the host system 12 are received by the TCP/IP interface function of the file system interface adaptor to which the request is directed. (That is, if an NFS host interface issues the request, the request will be received by the NFS interface adaptor 28. Similarly, for CIFS or HTTP host interfaces, the requests will be received by the CIFS or HTTP interface adaptors 30, 32. The requests will all, thereafter be handled in basically the same way as described hereinafter.) The TCP/IP interface function 70 will receive the request and pass it to the appropriate process function block 72 for further processing.

The process function block 72 will convert the received request to one for a common file system, and pass the converted request to the common file system function block 73 where it is received by a command process function 74 and transferred to a logical volume address converter function 76.

If the request is a lock request, it will also be passed to the lock manager function 78, which checks to determine whether or not access to the requested file is available. If access is available, the lock manager function 78 will initiate a reply ("access granted") to the process function block 72. The process function block 72 will then notify the host system 12 of the access grant via the TCP/IP interface function 70. Generally, the locking protocol is specified in NFS, CIFS, or HTTP level. If, on the other hand, access is not available, for example being locked by another request, the lock manager function 78 will so notify the process function 72, which will send a request to host system 12 to pend the lock request. When the lock request is subsequently made available by release of the lock by the other request, the lock manager 78 will notify the host system 12 that access is granted.

I/O read or write requests from a file system interface of the host system 12 will include a file name, a block number in the specified file, and a block link. Read and write requests travel through the TCP/IP interface function 70, the process function block 72 and the command process function 74, to the logical volume address converter 76. There, the information in the request is converted to a logical volume unit number, a block number in the logical volume, and a logical block length. The logical address converter 76 will then pass this information to the logical volume access function block 64 which, as did the logical volume access function block 64 of the SCSI interface adaptor 26, will handle the data transfer in the same way; that is, if it is a read request, the logical volume access function block 82 will check to see if the requested information resides in the cache memory 42 and if so, retrieve the information and return it to the host system 12 in response to the request. If the requested information is not reside in the cache memory 42, the logical volume access function block 82 will issue a request to the appropriate drive interface adaptor 46, requesting that the information be retrieved from the physical storage 20. Write requests are also handled in the same manner as described above respecting the logical volume access block 64 of the SCSI interface adapter.

The drive interface adapters 46 will operated in the same manner when responding to read or write requests, regardless of the interface adapter issuing the request. It will execute read/write operations to and from the physical storage 20 in response to requests received from the interface adapters 26, ..., 32. The drive interface adapters 46 preferably have the capability of performing write after processing from cache memory 42. (Write after processing is typically used, for example, in connection with mirrored storage. A write request will be processed by writing the data of the request to a specific physical storage unit 20. Subsequently, the same data, which may be stored in the cache memory 42, can be written to whatever disk storage unit (or units) 20 used for mirroring the data.)

Referring to FIG. 4, requests are received at the drive interface adapter 46 through the HIA (host interface adapter) interface function 100. Requests will include a logical-physical address that maps to an address in the physical storage 20 managed by the drive interface adapter 46. Conversion of the received logical-physical address to an address of physical storage 20 is performed by the logical/physical address conversion function 102, which may also be structured to execute write after processing if, for example, RAID architecture that implements mirroring is used, e.g., RAID 1.

The configuration of logical volumes may be established by a system administrator through a work station (not shown) connected to the storage controller 14 (FIG. 1) through the terminal interface 43. The system administrator may create data structures, for example in the form of the table 120 illustrated in FIG. 5. Each entry $122_1, \ldots, 122_M$ of the table 120 corresponds to a logical volume established by the system administrator. And, each entry 122 contains information describing the logical volume, including the mapping to the physical storage space 20. In addition, each entry 122 may contain an identification as to whether or not it is for a block system interface or a file system interface.

Logical volumes allow the physical storage 20 to be allocated between a block system and a file system as needed. For example, a first portion of the physical storage 20, say, one-third of the storage, may be allocated to block system data storage. Then, the remaining physical storage may be allocated to storing data for file system protocols. Later, it may be determined that less block system storage is actually needed so that the allocation could be changed, for example, something less than originally allocated, say one-fourth of the physical storage 20. The remaining physical storage 20 dedicated to file system storage is concomitantly increased.

Typically, logical volumes for a file system interface (e.g., the NFS or CIFS interface adapters 28, 30) will include file management information required by the common file system function block 73. This file management information provides the basis for the logical volume address conversion performed by the logical volume address converter 76 of the common file system block 73. Logical volume information for block system interface, i.e. the SCSI interface adapter 26, typically do not have such information, making it very difficult to access a logical volume for a block interface from a file interface. Therefore, in order to preclude unnecessary errors, status information can be included in each entry 122 for the logical volume, identifying whether that volume is a file system or a block system logical volume. Thus, as FIG. 5 illustrates, the entry $122_1$ for logical volume 1 contains information to identify it as a block system logical volume, whereas the entry $122_2$ for logical volume 2 contains information identifying it as a file system logical volume.

There is, however, a way, according to the present invention, of accessing a logical volume for a file system from a block system interface, such as the SCSI interface adaptor 26. According to this aspect of the invention, that portion of the host system 12 having a SCSI interface is provided with a backup utility 12a (FIG. 1) that, when running, can issue a volume backup request to the SCSI interface adaptor 26 of the storage controller 14. This will cause the entire logical volume identified in the request to be read from the physical storage 20, from the first address to the last address of the logical volume, without consideration of management information. The same portion of the host system 12 is also provided with the common file system library 12b, which provides the ability to recognize the file management information of the common file system function 73. Thereby, the host system 12 can access an arbitrary file on a logical volume for a file system from an interface of a block system. (Thus, by using a common file system library, the host system 12 to access a file on a logical volume for a file interface through a block system interface (e.g., a SCSI interface, since a common file system library can recognize the file management information of the common file system function 73,)

In order to provide at least a modicum protection against inadvertent or other access of file system data from a block system interface or adapter, the logical volume table information could include information respecting whether or not the particular logical volume is accessible to certain types of access. For example, a file system logical volume would include information that it was or was not accessible from a block system access. Thus, as indicated in FIG. 6, the logical volume table entry $132_1$ for logical volume 1 contains information identifying it as a file system volume, inaccessible to a block system access. Conversely, the entry $132_2$ indicates that logical volume 2 is also a file system volume, but it is accessible to a block system access. Similarly, the entry $132_M$ for volume M is also a file system logical volume, accessible to a block system access. The entry $132_J$ is, on the other hand, a block system logical volume.

Turning now to FIG. 7, there is illustrated an alternate embodiment of the invention. The storage controller 14 of FIG. 1 is illustrated as having three separate file system interface adapters 28, 30, and 32, one each to NFS, CIFS, OR CIFS type protocols. However, as FIG. 7 illustrates, the storage controller 14 may alternatively have a common file system adapter 140 for handling all three file system protocols (i.e., NFS, CIFS, or HTTP) in a single interface adapter 140. As shown, I/O and other requests from the host system 12, whether NFS, CIFS or HTTP, are received by a TCP/IP interface function 142. The TCP/IP interface determines the particular communication protocol and passes the request to the appropriate one of the process function blocks 144, 146, 148. From there, processing proceeds as described above. Further, for enhanced reliability and faster access to the physical disk units 20, the storage system 14 may include multiple interface adapters 140.

Turning now to FIG. 8, there is a further embodiment of the invention illustrated. In this embodiment, the SCSI interface adapter, designated with the reference numeral 26', includes the logical/physical address conversion/RAID control 102', that was contained in the drive interface adapter 46 (FIG. 4) of the embodiment illustrated in FIG. 1. Similarly, the NFS, CIFS, and HTTP interface adapters 28, 30, 32 could also have the logical/physical address conversion 102 included in them, thereby removing that function from the drive interface adapters 46. Alternatively, if the file system interface adapter 140 shown in FIG. 7 is used, that could also include the logical/physical address conversion 102'.

As discussed above in connection with FIG. 1, the storage controller 14 according to the present invention can present logical volumes for a block system interface and for a file system interface. Also, as discussed above, a block data access protocol such as SCSI can be used to provide access to a Storage Area Network (SAN) based storage system. Similarly, a Network File System (NFS) protocol or Common Internet File System (CIFS) protocol transported on Ethernet and TCP/CIP can be used to provide access to a Network Attached Storage (NAS). In accordance with another embodiment of the invention, the Fibre Channel protocol can also be used to provide access to a SAN.

For purposes of discussion, a volume that is accessed via a block system interface will be referred to as a SAN volume. Likewise, a volume that is accessed via a file system interface will be referred to as a NAS volume. Accordingly then, storage controller 14 can be said to present both a SAN volume and a NAS volume to a host device.

Figure 9B:
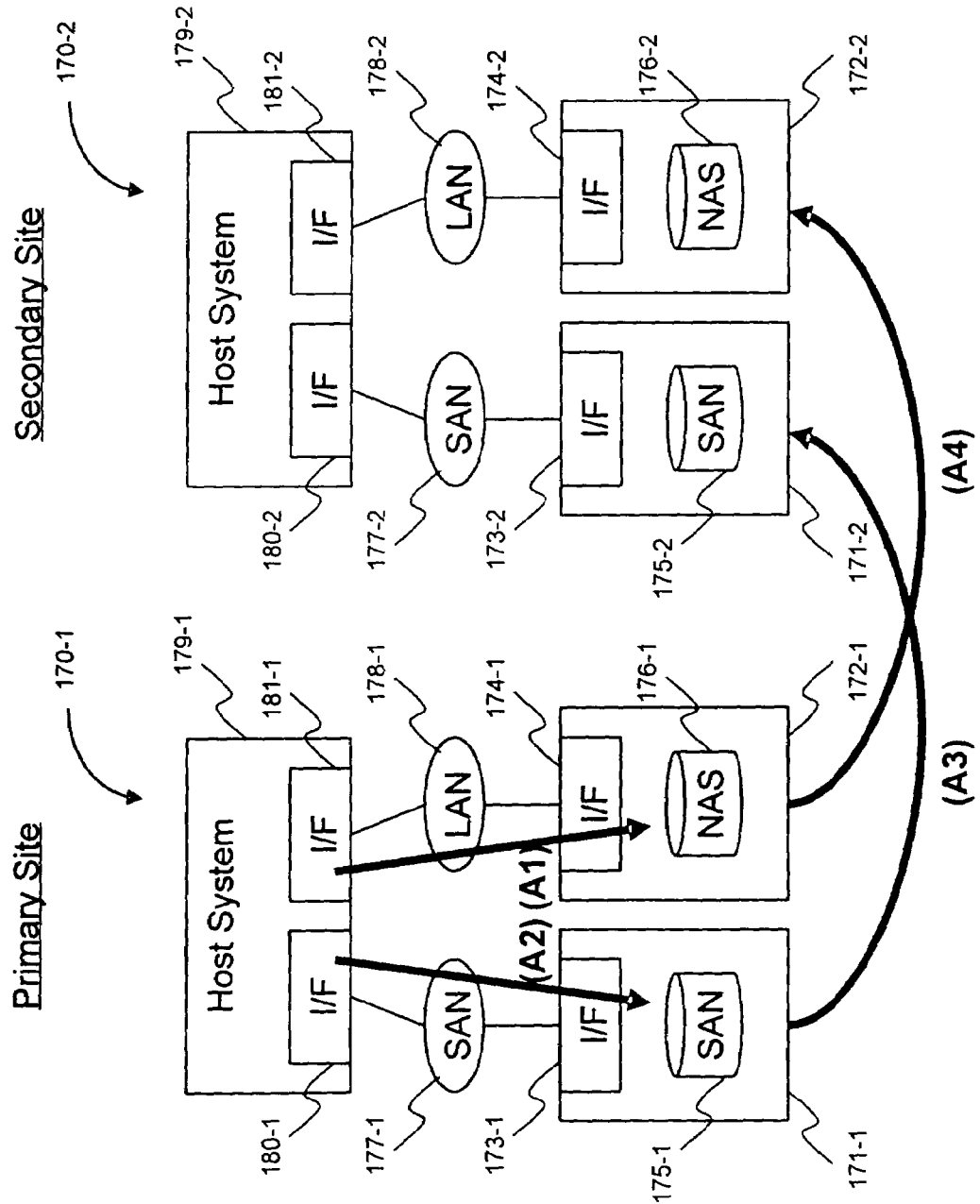
FIG. 9B shows illustrates time inconsistent remote copying between the SAN device and the NAS device shown in FIG. 9A.

Turning now to FIGS. 9A and 9B, another aspect of the invention will be discussed in the context of the shortcomings of the architecture shown in the figures. FIG. 9A shows an example of a storage system in which the storage devices are equipped with a remote replication function. Host systems 170-1 and 170-2 reside at primary site and secondary site, respectively. The "–1" and "–2" designations distinguish the primary and secondary sites. In the following discussion, where the reference numerals do not include the "–1" and "–2" designations it will be understood that the description applies to each site.

The primary site and the secondary site each have a host system 170. A typical host system will run a number of applications, some requiring a block-level I/O and others requiring file-level I/O. The host, therefore is likely to be equipped with an interface 180 for block I/O and an interface 181 for file I/O. The block I/O interface is connectable to SAN 177, while the file I/O interface is connectable to LAN 178 (local area network). A Fibre Channel is typically used top connect to SAN 177. Typically, an Ethernet connection is used to connect to LAN 178. It can be appreciated that other suitable communication protocols can be used to connect to SAN 177 and to LAN 178.

SAN device 171 has an interface 173 for block I/O and presents a logical volume for block system interface; that is, the interface provides access to a SAN volume 175 defined in the SAN device. NAS device 172 has an interface 174 for file I/O and presents a logical volume for file system interface; that is the interface provides access to a NAS volume 176 defined in the NAS device.

As can be seen in FIG. 9A, SAN devices 171-1 and 171-2 are data communication with each other via a suitable communication network. The network typically can be a Fibre Channel, ESCON, IP, and iSCSI; but it can be appreciated that other suitable communication protocols can be used. Replication (remote copying) between SAN devices is performed over the network. The NAS devices 172-1 and 172-2 are also in data communication with each other via a communication network, which is typically, but not limited to, Ethernet. Replication (remote copying) between NAS devices is performed over the network. SAN replication is performed asynchronously with respect to NAS replication. In the embodiment shown in the figure, SAN volume 175-2 and NAS volume 176-2 are mirrored volumes of SAN volume 175-1 and NAS volume 176-1 respectively.

What may become a problem with the system shown in FIG. 9A will be discussed with reference to FIG. 9B. Assume that at time A1 NAS device 172-1 receives a write request to NAS Volume 176-1 with write data W1, from host system 179-1. Assume further that at a subsequent time A2 SAN device 171-1 receives a write request to SAN volume 175-1 with write data W2, from host system 179-1. Since replication (remote copying) processing by SAN device 171-1 is performed independently of replication processing by NAS device 172-1, then it is possible that at time A3 data W2 will be replicated to SAN volume 175-2, while data W1 is replicated to NAS volume 176-2 at time A4 that is subsequent to time A3.

In a given situation, it may be important to maintain time consistency of the data that is written to the SAN device 171-1 and NAS device 172-1 when the data is mirrored to the respective devices, namely, SAN device 171-2 and NAS device 172-2. For example, in terms of the write operations shown in FIG. 9A, it may be desirable that the data W1 be replicated to NAS volume 176-2 prior to replicating the data W2 to SAN volume 175-2, since the data W1 was written before the data W2. For example, a database application in the host 179-1 may access both the SAN device 171-1 and the NAS device 172-1, and expect that the time consistency of the data write operations be preserved in the SAN device 171-2 and the NAS device 172-1 at the secondary site. As can be seen the architecture shown in FIG. 9A cannot ensure such time consistency.

Figure 10A:
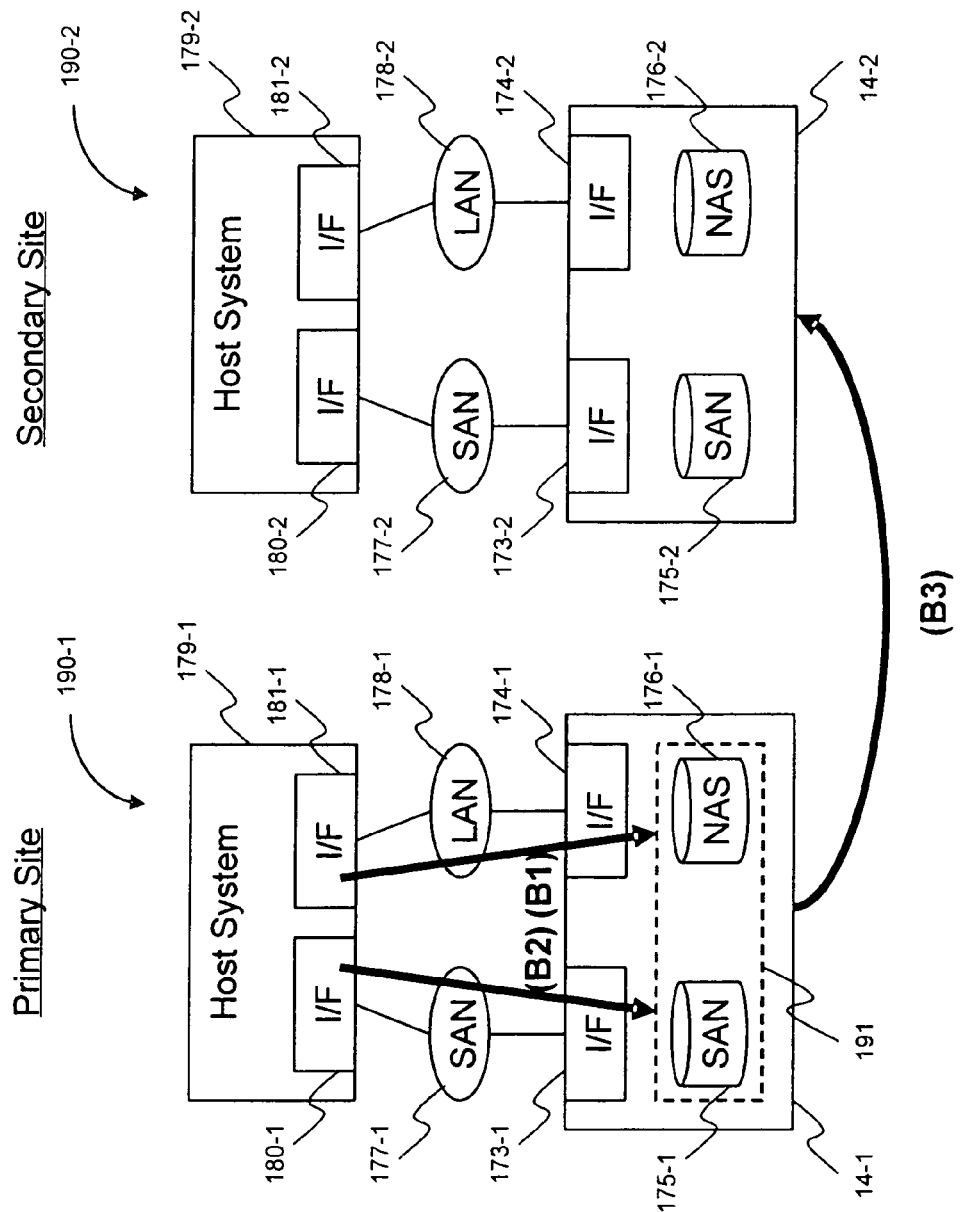
FIG. 10A shows an illustrative embodiment according to another aspect of the present invention.

FIG. 10A shows an embodiment of an aspect of the present invention which exhibits an ability to preserve time consistency. At a primary data site, a host system 179-1 can be configured with an interface 180-1 for block I/O (such as Fibre Channel or SCSI) and an interface 181-1 for file I/O (such as NFS or CIFS). The host is connected to a SAN 177-1 via the interface 180-1 and to a LAN 178-1 via the interface 181-1.

A storage controller 14-1 according to the invention includes an interface 173-1 configured for block-level I/O and an interface 174-1 configured for file-level I/O. The storage controller is discussed in further detail above. In this particular embodiment, the interface 173-1 is further configured for connection to the SAN 177-1, and can be a Fibre Channel interface or SCSI. The interface 173-1 is configured to receive I/O requests directed to a SAN device. The interface 174-1 is further configured for connection to the LAN 178-1, and can implement a file I/O protocol such as NFS or CIFS. The interface 174-1 is configured to receive I/O requests directed to a NAS device. The controller 14-1 of the present invention as shown in FIG. 10A, therefore, serves as a SAN device to service block-level I/O requests from host 179-1 via SAN 177-1, and at the same time to serve as a NAS device to service file I/O requests from the host via LAN 178-1. Other aspects of the storage controller 14-1 are shown in FIG. 1.

FIG. 10A also shows a secondary data site having a host system 179-2. The host can be configured with an interface 180-2 for block I/O (such as Fibre Channel or SCSI) and an interface 181-2 for file I/O (such as NFS or CIFS). The host is connected to a SAN 177-2 via the interface 180-2 and to a LAN 178-2 via the interface 181-2.

A storage controller 14-2 according to the invention includes an interface 173-2 configured for block-level I/O and an interface 174-2 configured for file-level I/O. As with storage controller 14-1, the interface 173-2 of the storage controller 14-2 is further configured for connection to the SAN 177-2, and can be a Fibre Channel interface or SCSI. The interface 174-2 is further configured for connection to the LAN 178-2, and can implement a file I/O protocol such as NFS or CIFS. The controller 14-2 serves as a SAN device to service block-level I/O requests from host 179-2 via SAN 177-2, and at the same time to serve as a NAS device to service file I/O requests from the host via LAN 178-2.

As can be seen in FIG. 10A, the storage controller 14-1 is in communication with the storage controller 14-2 via a suitable communication connection. Each storage controller is further configured to provide replication functionality such as remote copying. Logical volumes in the primary site that are managed by the storage controller 14-1 can therefore be replicated to the secondary site in corresponding logical volumes managed by the storage controller 14-2. Conventional replication techniques can be readily adapted and incorporated into the storage controllers 14-1 and 14-2 of the present invention to provide data replication (e.g., remote copy, data mirroring, etc). An example sampling of storage systems which provide data replication processing are shown in Appendix A titled "Hitachi Freedom Storage™ Software" and Appendix B "Integrating Sybase Adaptive Server Enterprise (ASE) with SnapMirror® to Provide Disaster Recovery".

In accordance with the particular embodiment of the invention shown in FIG. 10A, the storage controller 14-1 defines a SAN volume 175-1 and a NAS volume 176-1. Since the SAN volume and the NAS volume are logical volumes, they are shown in the figure within the bounds of the storage controller to indicate the fact that the storage controller defines, manages, and accesses the storage as logical volumes. Depending on specific implementations, it is understood that the SAN volume can comprise one or physical storage devices that are connected to the storage controller 14-1. Likewise, the NAS volume can comprise one or more physical storage devices that are connected to the storage controller 14-1. Block I/O requests from the SAN 177-1 are received at the interface 173-1. The interface 173-1 exchanges data with the SAN volume 175-1 to service the block I/O requests. Similarly, file I/O requests from the LAN 178-1 are received at the interface 174-1, which then exchanges data with the NAS volume 176-1 to service the file I/O request. This is schematically shown in FIG. 10C, where storage controller 14-1 is connected via a suitable data communication path 50 to a plurality of physical storage 20.

The storage controller 14-1 can define a consistency group 191 comprising the SAN volume 175-1 and the NAS volume 176-1. In the context of data replication such as remote copy, a "consistency group" comprises normally separate storage elements that are treated in an atomic fashion. Thus, if one storage element fails to be replicated then the group will fail to be replicated. A consistency group can be treated as a single entity for data replication (e.g., remote copy) purposes. The idea of "time consistency" refers to the order in time in which data is written to the storage elements in a consistency group. Thus, data replication is "time consistent" if the data is replicated to the secondary in the order in which it was originally received by the primary.

The embodiment shown in FIG. 10A exhibits time consistency of data write operations that are made to the volumes 175-1 and 176-1 which constitute the consistency group 191. Thus, for instance, at time B1 suppose storage controller 14-1 receives a write request to NAS volume 176-1 with write data W1' from host system 179-1. Then at a subsequent time B2, suppose storage controller 14-1 receives a write request to SAN volume 175-1 with write data W2' is received from the host system. The storage controller 14-1 can ensure time consistency of the data write requests when the data is replicated to the secondary site since it receives write requests directed to the SAN volume and write requests directed to the NAS volume. Thus at a time B3, the storage controller 14-1 will communicate data W1' to the storage controller 14-2 in order to mirror the data in NAS volume 176-2. At a time subsequent to time B3, the data W2' will be similarly replicated to SAN volume 175-2. Thus the write order of the data W1' and W2' is maintained in the secondary site.

There is another way to maintain the write order of the data W1' and W2' according to an alternate embodiment of this aspect of the invention. When the storage controller 14-1 receives data write requests directed to the SAN volume and data write requests directed to the NAS volumes, the storage controller 14-1 can associate time stamps with these write requests. The time that is associated with the write requests is the time when the storage controller 14-1 receives the request. The storage controller can communicate the data W1' and W2', along with their associated time stamps, to the storage controller 14-2 in any order. Then, the storage controller 14-2 writes the received data W1' and W2' to the SAN volume 175-2 and the NAS volume 176-2 in the order based on the time stamps associated with the data.

The storage system 14-1 and the storage system 14-2 can have multiple different types of communication paths. For example, the write requests for a SAN volume are sent via a Fibre Channel network and the write requests for a NAS volume are sent via a Ethernet network. Thus, even for this configuration, the write order is ensured by using the above described embodiments of the present invention.

Figure 10B:
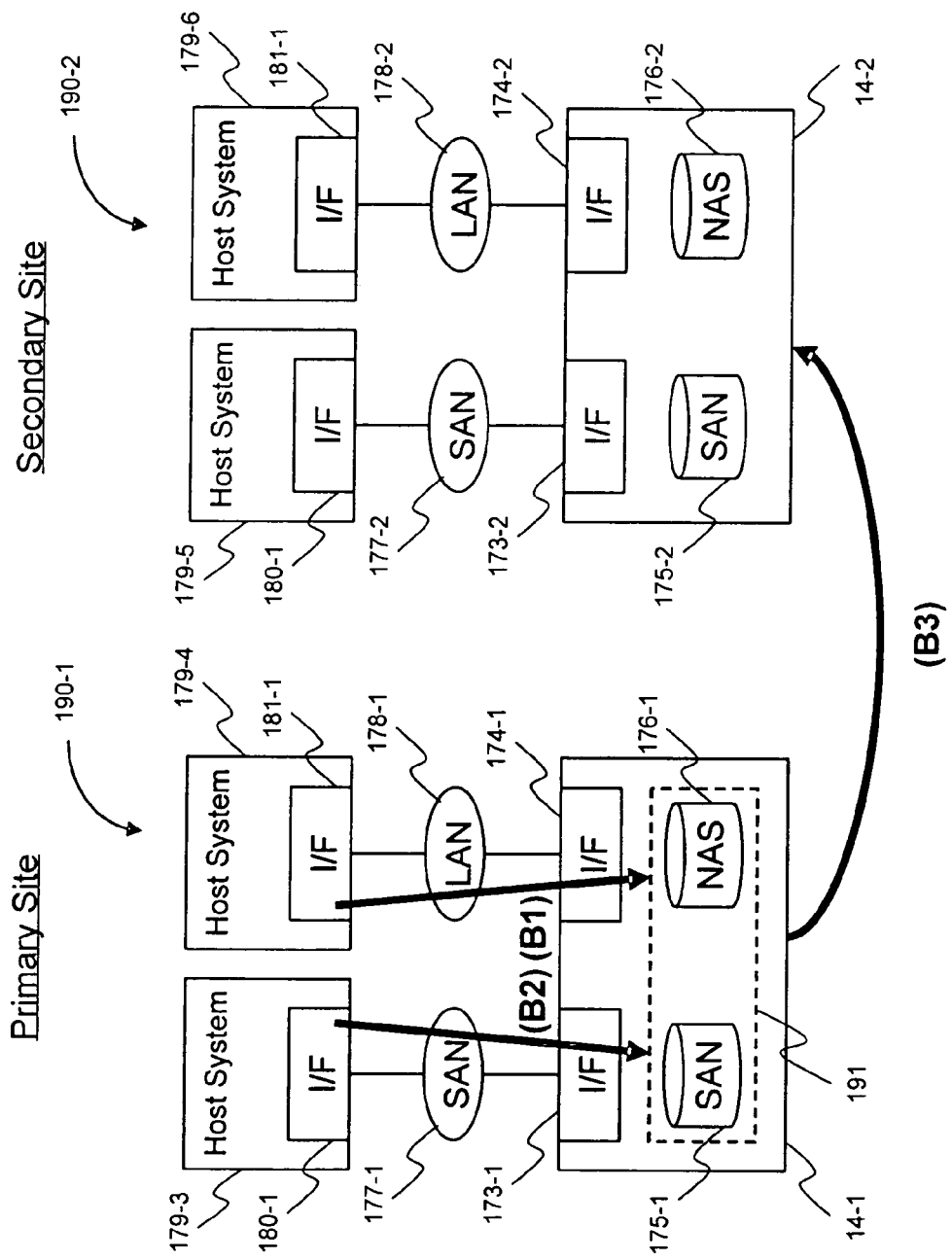
FIG. 10B shows an alternative illustrative embodiment of the present invention.
Figure 10C:
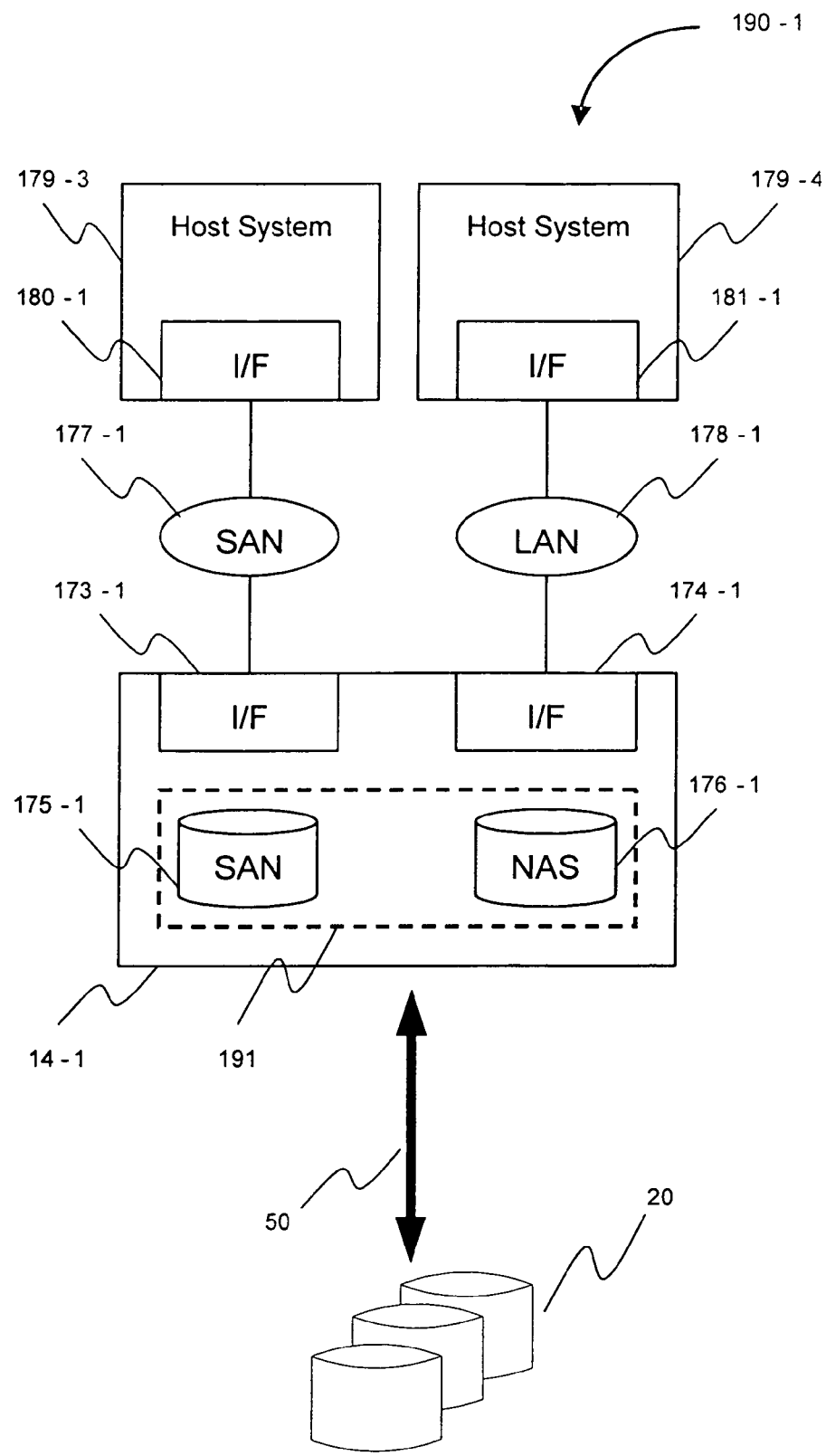
FIG. 10C shows the embodiment of FIG. 10A with physical storage.

FIG. 10B shows that the storage controller 14-1 can have different host systems 179-3, 179-4 communicating with it. There is no restriction as to the configuration of the host systems that communicate with the storage controller 14-1. Since the storage controller only "sees" requests coming from the SAN 177-1 or the LAN 178-1, the source(s) of the those requests is irrelevant. As noted in connection with the discussion of the embodiment shown in FIG. 1, the storage controller 14-1 can have any number of interfaces 173-1, 174-1. Two or more SAN volumes can be defined and managed by the storage controller. Two or more NAS volumes can be defined and managed by the storage controller. The secondary site likewise can be configured similarly.

Figure 11:
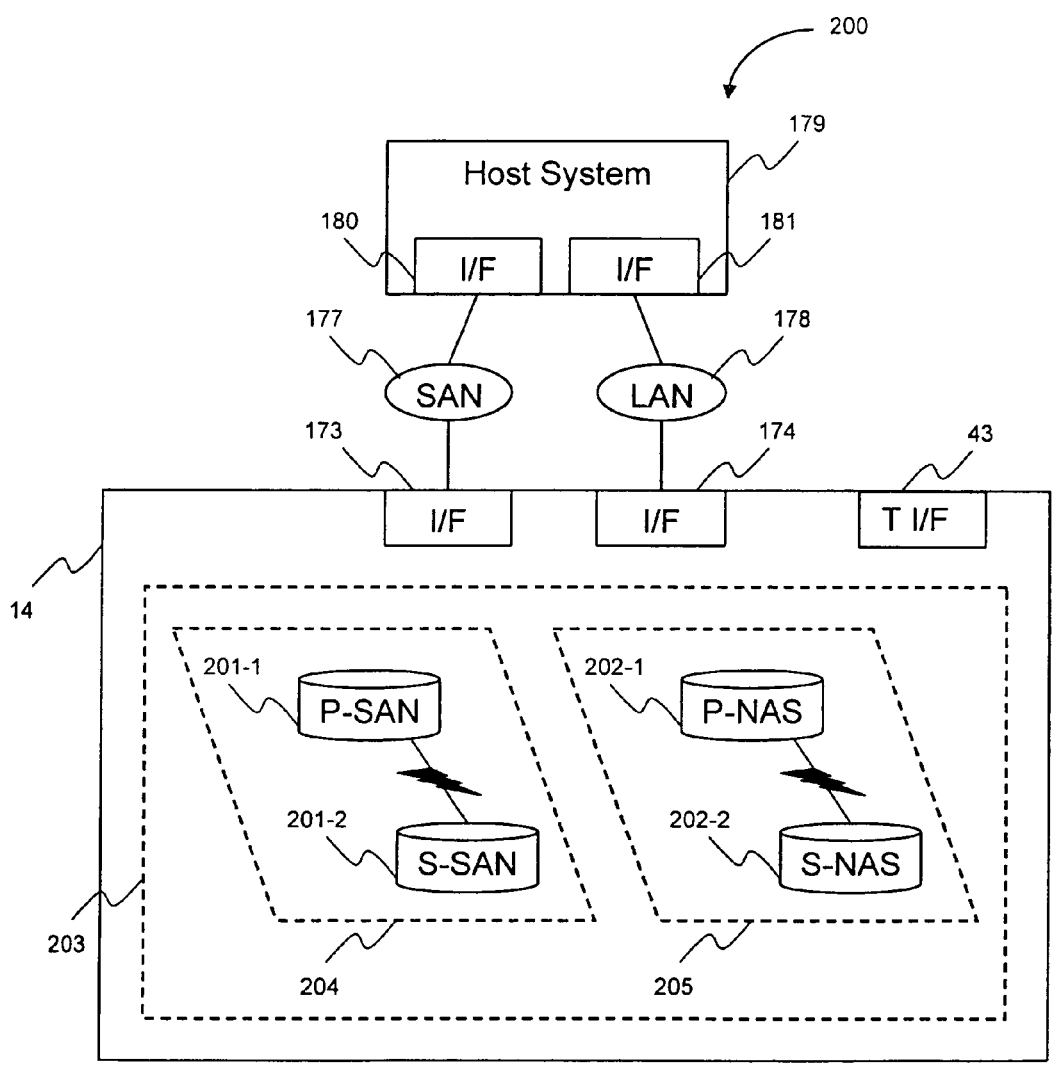
FIG. 11 illustrates an embodiment of another aspect of the present invention.

FIG. 11 shows an illustrative embodiment of yet another aspect of the present invention. Conventional RAID systems provide local replication functionality. The RAID controller of a RAID storage system can make a mirrored volume of a logical volume defined and managed by the storage system. The logical volume for which the mirrored volume is produced is typically referred to as the primary volume, while the mirrored volume is referred to as the secondary volume. The primary volume and secondary volume can be referred to as a "paired volume," or a "volume pair." When a write request to the primary volume is received, the RAID controller updates the secondary volume by performing the same requested write operation.

A volume pair can be "split" (also referred to as "breaking a pair"). This in effect takes the secondary volume offline. When the volume pair is split, the effect is that the secondary volume is frozen (i.e., data from the primary volume is no longer mirrored to the secondary volume). This make the secondary volume available for offline processing such as backup, data analysis, and so on. At some point, the secondary volume needs to be re-paired with its primary volume. Thus, at some point in time a Re-SYNC command may be received. In response, the volume pair is resynchronized. This conventional technique basically involves copying data from the primary volume to the secondary volume in a manner that results in the secondary volume once again mirroring the primary volume. After resynchronization is complete, then data replication between the primary volume and the secondary volume can resume once again.

FIG. 11 shows an illustrative embodiment of a controller according to an aspect of the present invention which incorporates the foregoing features of RAID systems. A controller 14 is configured with a first interface 173 suitable for block-level I/O and a second interface 174 suitable for file-level I/O. In the particular embodiment shown, the first interface is configured to communicate over a SAN 177 and the second interface is configured to communicate over a LAN 178.

The storage controller 14 defines and manages one or more logical volumes. In the particular embodiment shown in FIG. 11, the logical volumes include SAN volumes 201-1 and 201-2, and NAS volumes 202-1 and 202-2. It can be appreciated that the storage controller is connected to physical storage volumes (not shown) on which the SAN and NAS logical volumes are defined.

In accordance with this aspect of the invention, the storage controller 14 provides local replication functionality. SAN volumes 201-1 and 201-2 are configured as a volume pair 204, where logical volume 201-2 serves as a primary SAN volume (P-SAN) and logical volume 201-2 serves as a secondary SAN volume (S-SAN). NAS volumes 202-1 and 202-2 are likewise configured as a volume pair 205, where logical volume 202-1 serves as a primary NAS volume (P-NAS) and logical volume 202-2 serves as a secondary NAS volume (S-NAS).

FIG. 11 further shows that a consistency group 203 is defined and managed by the storage controller 14. The consistency group encompasses volume pair 204 and volume pair 205. When the storage controller receives a "split" command directed to the consistency group 203, each volume pair in the group (namely, volume pairs 204 and 205) is split. The split command can be received over the SAN 177 or over the LAN 178. Thus, a host system that has a connection to the SAN 177 can issue a split command. Similarly, a host system having a connection to the LAN 178 can issue a split command. Though FIG. 11 shows a single host 179 having interfaces 180 and 181 for connection respectively to the SAN and to the LAN, it can be appreciated that different hosts can be connected to the SAN and to the LAN (e.g., FIG. 10B). Alternatively, the split command can be received over a terminal interface 43; for example, by a system administrator.

A re-sync command can be sent to the storage controller 14 to re-establish the volume pairs. Volume pairs in a consistency group are re-established at the same time. Thus, volume pair 204 and volume pair 205 would be re-established upon receiving a re-sync command directed to the consistency group 203.

In a further aspect of the embodiment shown in FIG. 11, the storage controller 14 can receive a split command directed to a particular volume pair. For example, a host system that is connected only to the LAN 178, will "know" about the volume pair 205, but is not likely to have information about the volume pair 204. That host system would issue a split command that specifies only the NAS volume pair 205. However, the storage controller 14 would execute the split operation on the SAN volume pair 204, in addition to the NAS volume pair 205 because it is aware of the consistency group 203. Likewise, a split command directed to the SAN volume pair 204 would result in the NAS volume pair being split as well. Similarly, a re-sync command directed to one of the volume pairs, will cause all volume pairs in the same consistency group to be re-established.

Figure 12A:
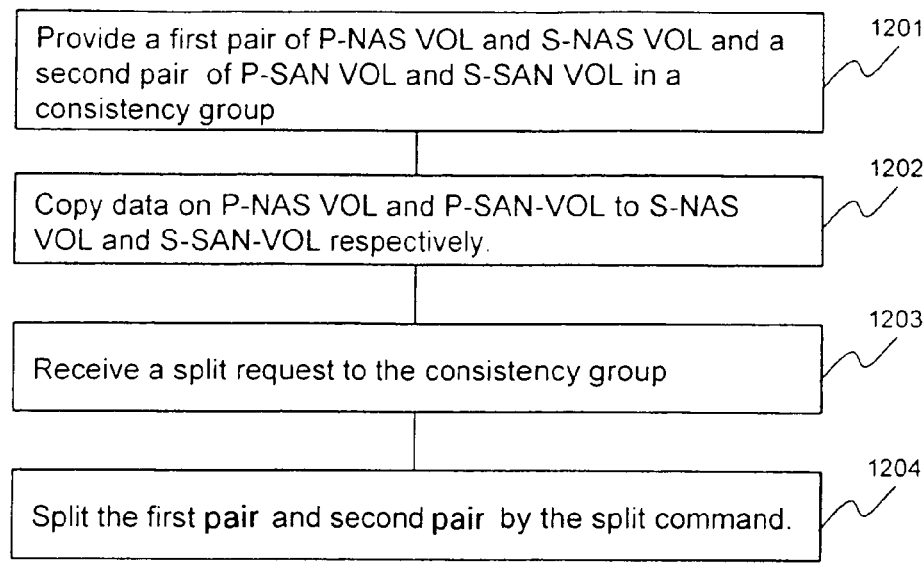
FIG. 12A highlights the processing that takes place in the storage system shown in FIG. 11.

FIG. 12A highlights processing in the storage controller 14 that involves split processing. At some initial time, the storage controller defines one or more volume pairs and one or more consistency groups, step 1201. For example, the configuration of FIG. 11 shows a single consistency group 203 that contains two volume pairs, 204, 205. During normal processing of I/O requests, write requests to a primary volume (e.g., P-SAN or P-NAS) will cause a mirror operation to be performed to the corresponding secondary volume (e.g., S-SAN or S-NAS), step 1202. At some later time, a split command is received at step 1203. In response to the split command, the storage controller 14 will reconfigure itself to cease mirroring operations for subsequent write requests, step 1204.

Figure 12B:
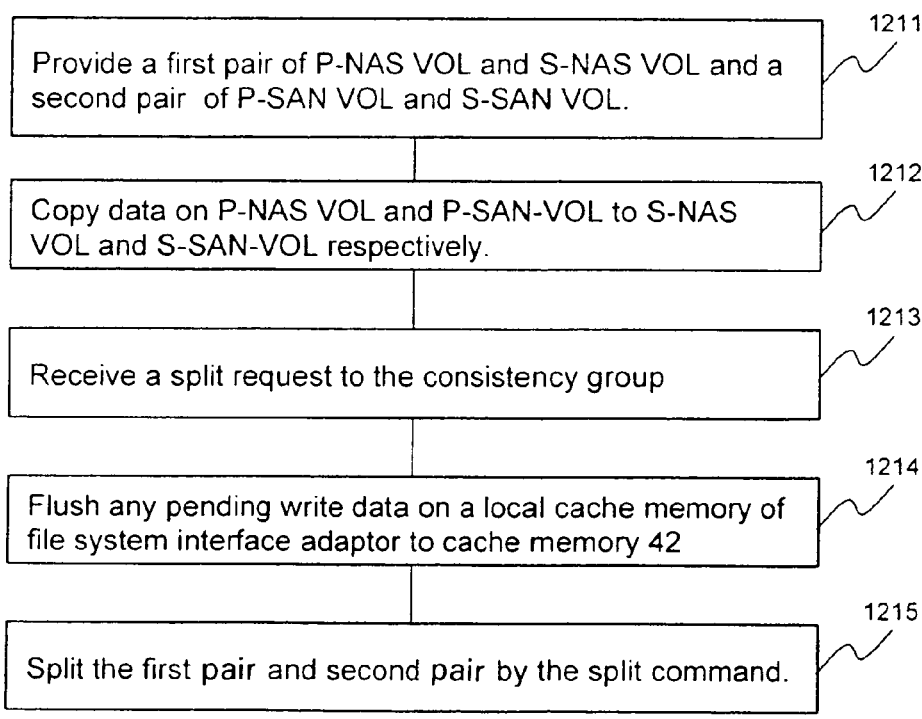
FIG. 12B highlights alternative processing that takes place in the storage system shown in FIG. 11.

FIG. 12B highlights alternative processing in the storage controller 14. FIG. 1 shows a cache memory 42 in the storage controller. When a split command is issued, it can be appreciated that the cache will be flushed before splitting a volume pair to ensure that the volumes contain the most recent data. Referring to FIG. 11, the file-level I/O interface 174 might be configured with its own local cache (not shown). The processing shown in FIG. 12B includes a cache flushing step to accommodate a local cache.

Thus, at some initial time, the storage controller 14 defines one or more volume pairs and one or more consistency groups, step 1211. During normal processing of I/O requests, write requests to a primary volume (e.g., P-SAN or P-NAS) will cause a mirror operation to be performed to the corresponding secondary volume (e.g., S-SAN or S-NAS), step 1212. At some later time, a split command is received at step 1213. In response to the split command, the local cache in the interface 174 is flushed (Step 1214) to the cache memory 42. It is noted that if interface 173 is configured with a local cache, it too would be flushed to cache memory 42. The storage controller 14 will then reconfigure itself to cease mirroring operations for subsequent write requests, step 1215. It is understood that this includes flushing the cache memory 42 to ensure that any data cached therein is written to the physical storage devices.

Figure 13:
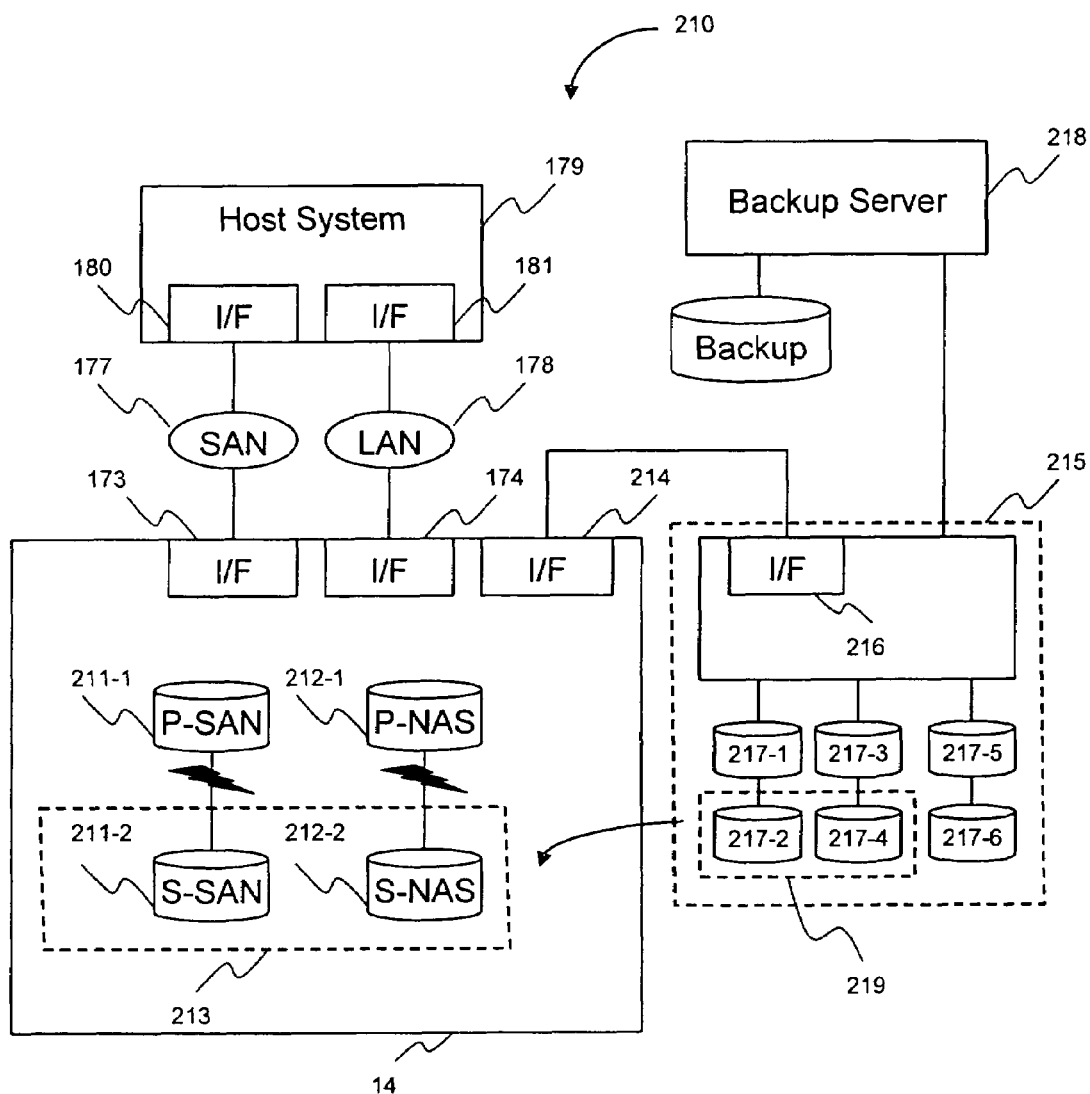
FIG. 13 shows an embodiment of yet another aspect of the present invention.

FIG. 13 shows an illustrative embodiment of yet another aspect of the present invention. A controller 14 is configured with a first interface 173 suitable for block-level I/O and a second interface 174 suitable for file-level I/O. In the particular embodiment shown, the first interface is configured to communicate over a SAN 177 and the second interface is configured to communicate over a LAN 178.

The storage controller 14 defines and manages one or more logical volumes. In the particular embodiment shown in FIG. 13, the logical volumes include SAN volumes 211-1 and 211-2, and NAS volumes 212-1 and 212-2. It is understood that the storage controller is connected to physical storage volumes (not shown) on which the SAN volume 211-1 and the NAS volume 212-1 are defined.

The storage controller 14 shown in FIG. 13 includes a third interface 214 configured for communication with a storage subsystem 215. The storage subsystem can be provided by any vendor of storage systems. The storage subsystem 215 includes an interface 216. A suitable communication link can be provided between interface 214 in the storage controller 14 and the interface 216; for example, Fibre Channel, SCSI, and so on.

The storage subsystem 215 presents one or more logical units (LUs) 217-1 to 217-6 to the outside. In accordance with this aspect of the invention, the storage controller 14 can access one or more of the logical units in the storage subsystem 215 to define one or more logical volumes in the storage controller. In the embodiment shown in FIG. 13, the storage controller defines logical volumes 211-2 and 212-2 based on the logical units 219 (comprising LUs 217-2 and 217-4) provided in the storage subsystem 215.

In accordance with this aspect of the invention, the storage controller 14 provides local replication functionality. SAN volumes 211-1 and 211-2 are configured as a volume pair, where logical volume 211-2 serves as a primary SAN volume (P-SAN) and logical volume 211-2 serves as a secondary SAN volume (S-SAN). NAS volumes 212-1 and 212-2 are likewise configured as a volume pair, where logical volume 212-1 serves as a primary NAS volume (P-NAS) and logical volume 212-2 serves as a secondary NAS volume (S-NAS). When the storage controller 14 mirrors a write operation directed to P-SAN 211-1, it will communicate over the communication link provided between the interface 214 and the interface 216 to mirror the data in the appropriate LUN 217-2, 217-4.

FIG. 13 shows that the volume pair comprising logical volumes 211-1 and 211-2 and the volume pair comprising logical volumes 212-1 and 212-2 are not defined as a consistency group, as compared to FIG. 11. Thus, a split command can be directed to split only the SAN volume pair, or to split only the NAS volume pair.

A backup server 218 can be connected to the storage subsystem to perform backups of the secondary volumes 211-2, 212-2. For example, a split command can be directed to the NAS volume pair, 212-1, 212-2. When the pair is split, the backup server 218 can perform a backup or other offline processing on the LU associated with the secondary NAS volume 212-2. Similarly, a split command can be directed to the SAN volume pair, 211-1, 211-2. When the pair is split, the backup server 218 can perform a backup or other offline processing on the LU associated with the secondary SAN volume 211-2.

What is claimed is:

1. A storage system comprising:
  a first interface configured to receive block-level I/O requests;
  a second interface configured for file-level I/O requests;
  a cache memory for temporarily storing data in response to the block-level I/O requests and the file-level I/O requests;
  a third interface configured for communication with another storage controller; and
  a data communication path suitable for data communication with a physical storage in order to exchange data with the physical storage in response to the block-level I/O requests and the file-level I/O requests,
  wherein the block-level I/O requests are serviced by exchanging data with a first storage area of the physical storage and the file-level I/O requests are serviced by exchanging data with a second storage area of the physical storage,
  wherein the first storage area is accessed as a first logical volume and the second storage area is accessed as a second logical volume,
  wherein the first logical volume and the second logical volume define a consistency group,
  wherein data contained in the first logical volume and in the second logical volume can be communicated to the other storage controller in order to replicate the data to secondary storage accessible by the other storage controller,
  wherein time consistency of write operations made to and between the first logical volume and the second logical volume is maintained at the secondary storage, and
  wherein, upon receiving a split command directed to one of the first and second logical volumes, split processing is performed on both the first and second logical volumes.

2. The storage system as recited in claim 1, wherein the physical storage comprises a plurality of physical storage devices.

3. A storage system comprising:
  a storage controller;
  a plurality of physical disk drives connected to the storage controller; and the storage controller including:
  a first interface configured to receive block-level I/O requests; a second interface configured for file-level I/O requests;
  a cache memory for temporarily storing data in response to the block-level I/O requests and the file-level I/O requests; and
  a third interface configured for communication with another storage controller,
  wherein the controller presents a first logical volume by using first storage area of the physical disk drives, and a second logical volume by using second storage area of the physical disk drives,
  wherein the controller receives a block-level write request to the first logical volume at the first interface and then a file-level write request to a second logical volume at a second interface,
  wherein the controller performs a write operation to the first logical volume and a write operation to the second logical volume,
  wherein the controller copies, through the third interface, write data corresponding to the block-level write request to a third volume and then write data corresponding to the file-level write request to a fourth volume, the third volume and the fourth volume being presented by the another storage controller, and
  wherein upon receiving a split command directed to one of the first and second logical volumes, the controller controls to execute a split operation on both the first and second logical volumes.

4. A method for operating a storage controller comprising:
  receiving block-level I/O requests at a first interface;
  accessing a physical data store to service the block-level I/O requests, including accessing a first logical volume defined in the physical data store, the accessing including temporarily storing data in a cache memory;

receiving file-level I/O requests at a second interface;
accessing the physical data store to service the file-level I/O requests, including accessing a second logical volume defined in the physical data store, the accessing including temporarily storing data in the cache memory;
replicating the data stored in the first logical volume and in the second logical volume, wherein the first logical volume and the second logical volume are defined as a consistency group, wherein the step of replicating maintains time consistency of write operations performed on and between the first logical volume and the second logical volume; and
upon receiving a split command directed to one of the first and second logical volumes, executing split processing on both the first and second logical volumes.

5. The method of claim 4, wherein the first interface is configured for communication with a SAN and the second interface is configured for communication with a LAN.

6. A method for operating a storage controller connectable to a first storage controller, comprising:
receiving a block-level write request to a first logical volume at a first interface of the storage controller and then a file-level write request to a second logical volume at a second interface of the storage controller, wherein the first logical volume and the second logical volumes are presented by the storage controller;
performing a write operation to the first logical volume and a write operation to the second logical volume, the write operations to the first and second logical volumes including temporarily storing data in a same cache memory;
copying write data corresponding to the block-level write request to a third volume and then write data corresponding to the file-level write request to a fourth volume, wherein the third volume and the fourth volume are presented by the first storage controller; and
upon receiving a split command directed to one of the first and second logical volumes, executing split processing on both the first and second logical volumes.

7. A storage system comprising:
a first interface configured to receive block-level I/O requests;
a second interface configured to receive file-level I/O requests;
a cache memory for temporarily storing data in response to the block-level I/O requests and the file-level I/O requests; and
a data communication path suitable for data communication with physical storage in order to exchange data with the physical storage in response to the block-level I/O request and the file-level I/O requests,
wherein the block-level I/O requests are serviced by exchanging data with a first storage area of the physical storage,
wherein write data to the first storage area is copied to a second storage area of the physical storage,
wherein the file-level I/O requests are serviced by exchanging data with a third storage area of the physical storage,
wherein write data to the third storage area is copied to a fourth storage area of the physical storage,
wherein if a split request is received, then at least write data to the first storage area that is received subsequent to receiving the split request is not copied to the second storage area or write data to the third storage area that is received subsequent to receiving the split request is not copied to the fourth storage area, and
wherein, if the split command is directed to one of the first and third storage areas, split processing is executed on both the first and third storage areas.

8. The storage system of claim 7, wherein if a re-sync request is received then the first storage area is resynchronized with the second storage area and the third storage area is resynchronized with the fourth storage area.

9. The storage system of claim 7, wherein the first storage area and the third storage area belong to a consistency group such that write data to the first storage area that is received subsequent to receiving the split request is not copied to the second storage area and write data to the third storage area that is received subsequent to receiving the split request is not copied to the fourth storage area.

10. The storage system of claim 7, wherein the first interface is further configured to communicate with a SAN.

11. The storage controller of claim 10, wherein the second interface is further configured to communicate with a LAN.

12. A method for operating a storage controller comprising:
receiving one or more block-level I/O requests at a first interface;
receiving one or more file-level I/O requests at a second interface;
accessing a first logical volume defined in a physical data store to service the block-level I/O requests, the accessing including temporarily storing data in a cache memory;
mirroring block-level I/O write requests to a second logical volume defined in the physical data store;
accessing a third logical volume defined in the physical data store to service the file-level I/O requests, the accessing including temporarily storing data in the cache memory;
mirroring file-level I/O write requests to a fourth logical volume defined in the physical data store,
upon receiving a split command directed to one of the first and third logical volumes, executing split processing on both the first and third logical volumes.

13. The method of claim 12, further comprising, upon receiving the split command, ceasing the action of mirroring block-level I/O write requests and ceasing the action of mirroring file-level I/O write requests.

14. A method for operating a storage controller comprising:
providing a first pair comprising a first logical volume and a second logical volume, and a second pair comprising a third logical volume and a fourth logical volume;
receiving a block-level write request at a first interface;
receiving a file-level write request at a second interface;
performing a write operation to the first logical volume in accordance with the block-level write request after temporarily storing data corresponding to the block-level write request in a cache memory;
copying write data corresponding to the block-level write request to the second volume;
performing a write operation to the third logical volume in accordance with the file-level write request after temporarily storing data corresponding to the file-level write request in the cache memory;
copying write data corresponding to the file-level write request to the fourth volume; and
breaking both of the first pair and the second pair in accordance with a split command directed to one of the first pair or second pair.

15. The method of claim 14, further comprising, upon receiving the split command, ceasing the action of mirroring block-level I/O write requests and ceasing the action of mirroring file-level I/O write requests.

16. A storage system comprising:
   a controller;
   a first physical storage connected to the controller;
   a first interface configured to receive block-level I/O requests;
   a second interface configured to receive file-level I/O requests;
   a cache memory for temporarily storing data in response to the block-level I/O requests and the file-level I/O requests; and
   a third interface configured for communication with a storage subsystem, the storage subsystem comprising second physical storage,
   wherein the controller presents a first logical volume for the block-level I/O requests by using a first portion of the first physical storage, and a second logical volume for the file-level I/O requests by using a second portion of the first physical storage,
   wherein the controller presents a third logical volume and a fourth logical volume by using the second storage,
   wherein the controller copies data in the first logical volume to the third logical volume and copies data in the second logical volume to the fourth logical volume, and
   wherein, upon receiving a split command directed to one of the first and second logical volumes, split processing is performed on both the first and second logical volumes.

17. The storage system of claim 16, wherein the third logical volume is a mirrored volume of the first logical volume, wherein the fourth logical volume is a mirrored volume of the second logical volume, wherein when the split command is received, then write data to the first logical volume is not copied to the third logical volume and write data to the second logical volume is not copied to the fourth logical volume.

18. A method for operating a storage controller of a first storage system comprising:
   providing a first logical volume and a second logical volume by using physical storage included in the first storage system;
   providing a third logical volume and a fourth logical volume by using physical storage included in a second storage system, the second storage system being externally to and in data communication with the first storage system;
   receiving one or more block-level I/O requests to the first logical volume at a first interface;
   receiving one or more file-level I/O requests to the second logical volume at a second interface;
   performing write operations to the first logical volume in response to receiving the block-level I/O requests, after temporarily storing data corresponding to the block-level I/O requests in a cache memory;
   performing write operations to the second logical volume in response to receiving the file-level I/O requests, after temporarily storing data corresponding to the file-level I/O requests in the cache memory;
   copying write data corresponding to the block-level write requests to the third volume;
   copying write data corresponding to the file-level write requests to the fourth volume; and
   upon receiving a split command directed to one of the first and second logical volumes, executing split processing on both the first and second logical volumes.

19. The method of claim 18 wherein the third logical volume is a mirrored volume of the first logical volume, wherein the fourth logical volume is a mirrored volume of the second logical volume, wherein when the split command is received, then write data to the first logical volume is not copied to the third logical volume and write data to the second logical volume is not copied to the fourth logical volume.

20. A system comprising:
   a first storage subsystem including a physical storage, a first interface configured to receive block-level I/O requests, a second interface configured to receive file-level I/O requests, and a cache memory for temporarily storing data in response to the block-level I/O requests and file-level I/O requests;
   a second storage subsystem connected to the first storage subsystem, the second storage subsystem managing a plurality of logical units; and
   a backup server connected to the second storage subsystem,
   wherein the first storage subsystem presents a first logical volume for the block-level I/O requests by using the physical storage and a second logical volume for the file-level I/O requests by using the physical storage,
   wherein the first storage subsystem presents a third logical volume and a fourth logical volume by using the logical units,
   wherein the first storage subsystem copies data in the first logical volume to the third logical volume and data in the second logical volume to the fourth logical volume,
   wherein the backup server backs up data in the logical units, and
   upon receiving a split command directed to one of the first and second logical volumes, split processing is performed on both the first and second logical volumes.

* * * * *